Figure 1:
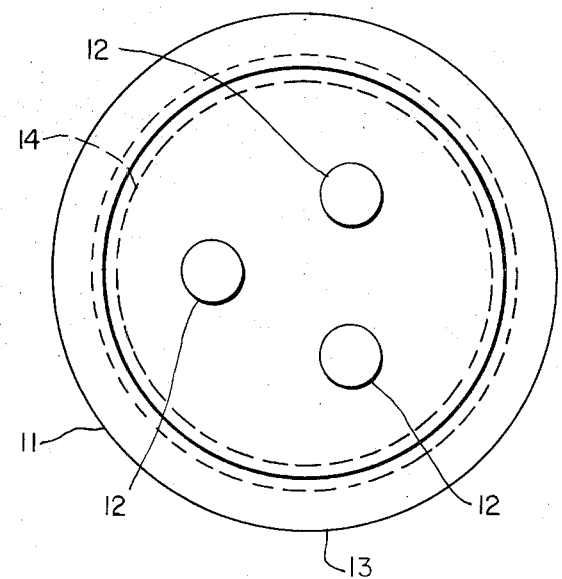

United States Patent [19]

Yonemochi

[11] 3,768,998

[45] Oct. 30, 1973

[54] METHOD OF SMELTING HIGH QUALITY FERROSILICON

[76] Inventor: Jutaro Yonemochi, Koadachi 171, Kome-shi, Tokyo, Japan

[22] Filed: Nov. 22, 1971

[21] Appl. No.: 201,007

[52] U.S. Cl............................ 75/12, 13/20, 75/11
[51] Int. Cl......... C21c 5/52, H05b 3/62, C21c 5/52
[58] Field of Search .................. 75/10, 11, 12, 129; 13/9, 33, 20

[56] References Cited
UNITED STATES PATENTS

| 1,842,536 | 1/1932 | Browne | 75/12 |
| 2,266,123 | 12/1941 | Kinzel | 75/129 |
| 3,465,085 | 9/1969 | Yonemochi | 13/9 |
| 1,853,544 | 4/1932 | Browne | 75/12 |
| 2,715,064 | 8/1955 | Burns | 75/129 |
| 2,144,200 | 1/1939 | Rohn | 75/12 |
| 3,215,522 | 11/1965 | Kuhlmann | 75/11 |
| 1,134,127 | 4/1915 | Harrison | 75/11 |

Primary Examiner—L. Dewayne Rutledge
Assistant Examiner—Peter D. Rosenberg
Attorney—Fidelman, Wolffe & Leitner

[57] ABSTRACT

An electric furnace operating as a pure resistance furnace in which molten slag layers are retained, carbon is immersed in said slag layers, and raw material is held on the upper portion thereof, immersing its lower portion into the slag layers, whereby direct reducing and indirect reducing (gas reduction) are effected continuously.

6 Claims, 2 Drawing Figures

INVENTOR

BY

ATTORNEY

METHOD OF SMELTING HIGH QUALITY FERROSILICON

The present invention is directed to a method of smelting ferrosilicon. In particular, the invention is directed to a method of smelting using a resistance furnace in such a manner that both direct and indirect reduction of the raw material occurs at the same time. In the method of the present invention the slag layers contain carbon in large quantities and the raw material remains in the upper area, generally on top of the slag.

When iron alloys having high silicon content, such as ferrosilicon, are smelted, a submerged arc furnace is generally employed and electric arc heating is utilized. The operation thereof has the following characteristics:

1. Due to the submerged arc furnace for reducing the silica a high temperature arc, that is, one of more than about 3,000° C. is utilized. 2. Raw silica of lower impurity content is used to reduce slag production, which amounts to only about 2-6 percent based on the product ferrosilicon.

3. When the product is removed from the furnace, it completely flows out, that is, none of the molten body remains in the furnace.

In an operation method such as described above, the ends of electrodes reach high temperatures, e.g. more than 3,000° C., so that not only silicon is reduced from silica. However, other unfavorable reducing reactions also occur during such operations, consuming thermal energy and/or power energy. These reactions produce undesired products, for example, aluminum is reduced from alumina, resulting in an increase of impurities contained in the product ferrosilicon. In addition, due to the high temperature, silica ($SiO_2$) is converted in large amounts to SiO which is vaporized, and forms a pulverized dust, thus causing air pollution.

The theoretical temperature to reduce silica to silicon is given by the following formulas:

$SiO_2$ (molten) + 2C (solid) = Si(molten) + 2CO (gas)

100 percent Si $\Delta Z° = 159230 - 87.17\ T$ $\Delta Z° = 0$ $T = 1827°\ K$ i.e. $1554°\ C$ 75 percent Si $\Delta Z° = 145930 - 88.50\ T$ $\Delta Z° = 0$ $T = 1760°\ K$ i.e., $1487°\ C$ 45 percent Si $\Delta Z° = 154930 - 88.00\ T$ $\Delta Z° = 0$ $T = 16490\ K$ i.e. $1376°\ C$ The reduction in temperature of silicon, as compared to Al, Ca, Mg, SiO or like is quite low. Further, in industrial processing, in order to increase reaction velocity, temperatures of from 150° to 200° above that required to initiate reduction are utilized. However, the melting temperature of silica is 1,670° to 1,725° C. Therefore, the silica may not be sufficiently fluidized at operating temperature within the above ranges. Accordingly, surface contact between the silica and the carbon present in the furnace may not be sufficient to effect significant amounts of reduction of the silica.

The above reaction requires direct contact between the silica and the carbon, and this may not actively take place. That is, since the products are difficult to disperse after the reduction, the reaction does not often continue.

In the light of the various disadvantages, as mentioned above, relative to methods of smelting ferrosilicon heretofore, the present invention, as a result of repeated experiments and studies, has been developed and affords considerable advantages.

The distinguishing features of the present invention lie in a method of smelting high quality ferrosilicon wherein the molten slag is accumulated in the furnace in addition to the raw materials which are a combination of silica (quartz), iron ores, carbon containing material (for use in reduction), and slag making material. The massive amounts of carbon are immersed in the slag layer. Due to the buoyance thereof, the compounded raw material is retained at the upper portion of the furance. Further, at the same time, the ends of electrodes are always immersed in the molten slag. The ratio of the components in the furance, $CaO + MgO + BaO/SiO_2$ should be maintained below about 0.6. By meeting the above requirements, the temperature can be lowered without lowering the activity of the $SiO_2$, since the slag layer acts as an electric resistance and the electric current produces Joule heat, by which a temperature necessary and sufficient for reduction of silicon is obtained. Thus the present invention presents a method of smelting high quality ferrosilicon that allows lower temperature operation without lowering the activity of the $SiO_2$ in the molten slag. The process allows use of temperatures of below 1,800° C. in the molten slag.

Accordingly, a primary object of the invention is to provide an electric resistance furnace wherein molten slag is retained in the furnace, electrodes are immersed in the slag, the electrodes acting as an electric resistance, and electric current is passed so that Joule heat is generated, by which the reduction reaction occurs.

Another object is to provide uniform temperature distribution in the radial direction and to form a rational temperature gradient in the axial direction within the electric furnace. A further object is to provide direct reduction in the slag layer of the furnace and preheating and indirect reduction (gas reduction) in the compounded raw material layer.

A further object is to allow use of complex compounds of silica and other oxides, the molten slag therefrom being high in its silica concentration and of high activity, which has a melting point close to the reduction temperature of silica.

Still another object of the invention is the use of an electric power density (350 KW - 450 Kw), with the radial area of the molten slag as a standard, such that the slag layer is maintained at a temperature, preferably of from about 1,600° C to 1,700° C, and sufficient to easily carry out the silica reduction.

Thus the ultimate object of the invention is to provide a process for smelting of ferrosilicon having an extremely high yield, with extremely low electrode and electric energy consumption.

Other objects and advantages will be obvious from the following detailed description of the invention.

Referring to the accompanying drawings, FIG. 1 shows a plan view of a furnace which may be utilized in accord with the present invention.

Figure 2:
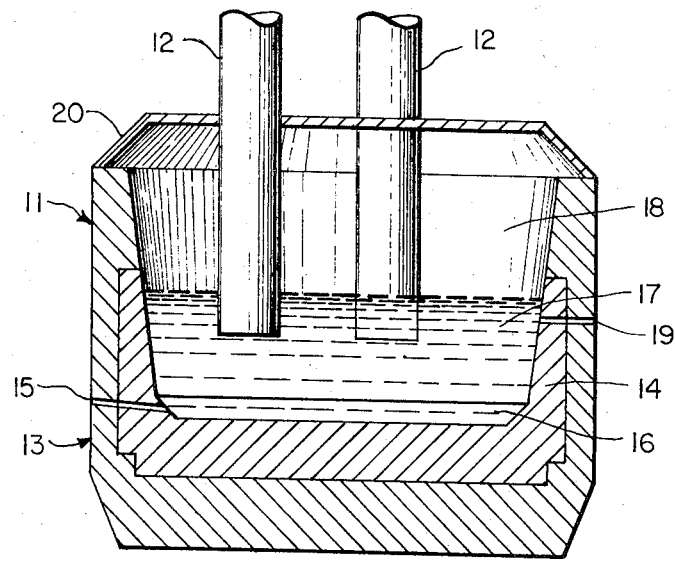

FIG. 2 is a front elevation of the furnace.

In the drawings, the furnace indicated generally by 11, comprises a shell 13, liner 14, and electrodes 12. In operation, the raw materials are charged through cover plate 20, and slowly pass downward, the upper raw material containing layer being indicated by the numeral 18, through the high slag area, indicated by 17, and the molten ferrosilicon is collected at the bottom of the furnace 16. During operation product molten ferrosilicon is withdrawn through passage 15 and the excess molten slag is withdrawn through passage 19.

In order to eliminate disadvantages, as described above, the present invention is arranged so that when compounded raw material is made by compounding silica (quartz), iron ores, carbon containing material, and slag making material, complex compounds of silica and other oxides are utilized that will have high concentrations of silica when molten, consequently the activity of the silica containing material is high, and the melting point of the slag is close to the reducing temperature of the silicic acid.

Slags, which fulfill the above conditions are, for example, as follows:

| | B | CaO% | $Al_2O_3$% | MgO% | $SiO_2$% | M.P. (app., °C.) |
|---|---|---|---|---|---|---|
| 1. Anorthite | 0.522 | 22 | 36 | | 42 | 1500 |
| 2. Fridimite | .286 | 20 | 10 | | 70 | 1500 |
| 3. Cristbalite | .537 | 25 | | 10 | 65 | 1500 |

A molten body comprising the above components is made and large amounts of carbon containing materials are added to the furnace. The reducing reaction is carried forward on the surface of the carbon material. In general, the specific gravity of the carbon material is about 1 or below, while the specific gravity of the molten body exceeds 2.5, thus special consideration should be paid to insure immersion of the carbon material in the molten body.

Therefore, in the present invention, the raw material used is made by compounding quartz, iron ores, carbon containing material and slag making material, and a metal layer, a molten slag layer and a solid compound raw material layer are formed respectively, from the furnace bottom to its top.

The molten slag layer in the present invention is such that the particles made from the silica, alumina, lime, magnesia or iron oxide contained in the above compounded raw material is not removed from the furnace, and, with the massive carbon material, the furnace is filled. The reason being that the amount of carbon containing material decreases as a result of the reduction and is never molten and, therefore, portions of the carbon material are forced into the molten layer in succession by the weight of the compounded material. The buoyancy of the carbon material and the gravity of the compounded raw material located at the upper portion are maintained in balanced proportion, the compounded raw material layer is partially molten, being immersed in the molten layer, and its melting velocity is maintained at a given value.

The ends of the electrodes are positioned so as to be always immersed in the molten slag, and thus an electric current passes towards the metal layer accumulated on the furnace bottom effectively making the molten slag layer a resistance unit. The Joule heat generated at this time provides the heat in the furnace and supplies all the thermal energy necessary for the chemical reactions.

The advantageous point of such heating by resistance, as described above, is the ability to form, at will, necessary and sufficient heat, unlike arc heat. The inside of the furnace is arranged so that, in the present invention, if large molten metal layers and molten slag layers are present in the furnace, a uniform temperature distribution may be obtained in the radial direction and a rational temperature gradient may be maintained in the axial direction in the electric furnace. Therefore, preheating and preliminary reduction is possible in the compound raw material layer.

The density of electric power should be from about 350 KW to 450 KW per square meter, using a horizontal plane of the molten slag layer as the standard. When the silicon component in the product is high, the density of electric power may well be increased; and when silicon component is low, the density of electric power may well be decreased.

With the determination of the density of electric power and the slag composition described above, the temperature of the slag layer may be maintained at less than 1,800° C., preferably in the range of from about 1,600° C. to 1,700° C., necessary and sufficient for carrying out reduction easily. Thereby, the reaction represented by the formula $SiO_2 + 2C = Si + 2CO$ is effected on the surface of the carbon containing material present in the molten body, and ferrosilicon is deposited on the furnace bottom in combination with iron formed by either of the following reactions, $FeO + C = Fe + CO$ or $FeO + CO = Fe + CO_2$.

At the time of the foregoing reactions, the carbon monoxide generated ascends and as it ascends, moving into the compounded raw material layer located at the upper portion, gas reduction (indirect reduction) reactions such as:

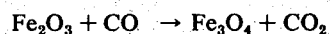

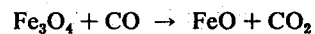

$$Fe_2O_3 + CO \rightarrow Fe_3O_4 + CO_2$$
$$Fe_3O_4 + CO \rightarrow FeO + CO_2$$

occur.

In the slag layer, lowering of the concentration of iron relative to the silicon by reactions of the FeO with reduction and separation of the silicon, is compensated for by the melting of the compounded raw material, and the necessary concentration thus is always maintained.

The product metal (ferro-silicon) accumulated on the furnace bottom can be cast, e.g. every hour. The furnace shown being partially (approx. 15–20 percent) extracted in the extractions. The slag formed from the raw material is partially removed in the same relative percentages at the same time as the product metal, and thus since both metal and slag are only partially removed, the status of inside of the furnace is not greatly changed. 11

In operation, the size of the charge to the furnace depends on the furnace size as well as the rate at which processing can be effected. However, generally charges can vary from about 2,500 kg to about 3,500 kg, preferably about 2,800 kg to 3,200 kg. The charge contains from about 50 percent to 65 percent, preferably about 55 percent to 60 percent by weight silica containing material, about 8 percent to about 15 percent, preferably about 9 percent to 12 percent by weight iron ore, and about 25 percent to 35 percent, preferably about 28 percent to 32 percent by weight carbon containing material, the remainder being slag generating material, but such percentages, of course, depend on the purity of each of the raw materials, and the desired product composition. In addition, the current utilized will vary in with the speed at which processing is to be effected, and the composition of the charge.

Finally, the process of the present invention may be utilized to produce almost any ferrosilicon, but is most easily adapted to producing materials of from about 30 percent to about 80 percent silicon, preferably about 60 percent to 80 percent silicon, by weight based on the total product.

EXAMPLE 1

The operation of the present invention is carried out according to the method of the present invention using the following parameters:

| | |
|---|---|
| Capacity of transformer | 25,000KVA |
| Average power load | 20,000KW |
| Terminal voltage of electric furnace | 230V |
| Current | 56,000A |
| Power factor of electric furnace | 89.50% |
| Electric power unit | 7,000KWh |
| Silica used | 1,700Kg |
| Iron ore | 300Kg |
| Slag making material | 70Kg |
| Massive carbon material (coke) | 890Kg |
| Electrodes | 25Kg |

In this operation, the current wave was an extremely satisfactory sine wave, as measured by an oscilloscope and thus the furnace functioned as a resistance furnace. That is, both electric power and electrode consumption are extremely low, and ferrosilicon of a high silicon content was produced.

What is claimed:

1. A method of continuously producing ferrosilicon characterized by low electrode and electric energy consumption utilizing an electric resistance furnace, comprising charging said furnace at the upper portion thereof with a carbon containing compounded ferrosilicon producing mixture, causing said mixture to gradually settle in said furnace through a next lower high molten slag containing layer wherein molten ferrosilicon is produced, causing said produced molten ferrosilicon to settle into a next lower molten product containing area, and withdrawing portions of said product ferrosilicon and said slag at intervals, and maintaining said molten slag at a temperature of up to about 1,800° C. by charged electrodes, said electrodes being positioned so that their ends are immersed in said slag containing layer, the slag containing layer containing calcium oxide, magnesium oxide, barium oxide, and silica and the weight ratio of said oxides to said silica being below 0.6.

2. The process of claim 1 wherein from 15 to 20 percent of said product and said slag are withdrawn at said intervals.

3. The process of claim 1 wherein said slag temperature is maintained at from 1,600 to 1,700° C.

4. The process of claim 1 wherein said electrodes are charged so that a radial power density of from 350 KW/square meter to 450 KW/square meter is maintained in said slag.

5. The process of claim 1 wherein the slag producing material in said charges is selected from the group consisting of Anorthite, Fridimite, and Cristbalite.

6. The process of claim 1 wherein said charge contains carbon containing material of a specific gravity of up to 1.

* * * * *